(12) United States Patent
Chen

(10) Patent No.: US 6,216,317 B1
(45) Date of Patent: Apr. 17, 2001

(54) HANDLE ADJUSTABLE IN LOCATING ANGLE THEREOF

(76) Inventor: Tzn-Cha Chen, 124, Chou Ser Road, Hou Li Hsiang, Taichung Hsien (TW)

( * ) Notice: Subject to any disclaimer, the term of this patent is extended or adjusted under 35 U.S.C. 154(b) by 0 days.

(21) Appl. No.: 09/472,750

(22) Filed: Dec. 27, 1999

(51) Int. Cl.$^7$ ...................................................... B25G 1/00
(52) U.S. Cl. ................................. 16/430; 16/900; 403/84
(58) Field of Search ................ 16/430, 900; 280/47.315, 280/47.371; 403/83, 84, 85

(56) References Cited

U.S. PATENT DOCUMENTS

| | | | |
|---|---|---|---|
| 4,271,731 | * | 6/1981 | Suligoy et al. .................... 81/177 A |
| 5,239,977 | * | 8/1993 | Thomas .............................. 403/83 X |
| 5,674,027 | * | 10/1997 | Warnaar ............................. 403/83 X |

* cited by examiner

Primary Examiner—Lynne H. Browne
Assistant Examiner—John R. Cottingham
(74) Attorney, Agent, or Firm—W. Wayne Liauh (57) ABSTRACT

A handle is adjustable in a locating angle thereof and is provided at the front end thereof with a receiving slot having an inner hole for receiving a spring and an urging block. The urging block is provided with a horizontal long slot having a front inclined plane. The handle is provided with a through hole passing through the inner hole. The through hole receives a spring and a press rod having a front inclined plane, a straight section passing through the horizontal long slot. A hand tool head is provided at the rear end thereof with a protrusion which is pivoted in the receiving slot and is provided with a retaining portion capable of joining with the top of the urging block. When the press rod is extended, the urging block is urged by the front inclined plane of the press rod so as to locate the hand tool head. The hand tool head is prevented from the free fall by the elastic force of the compressed spring. When the press rod is pressed to displace downward, the urging block displaces inward.

5 Claims, 8 Drawing Sheets

HANDLE ADJUSTABLE IN LOCATING ANGLE THEREOF

FIELD OF THE INVENTION

The present invention relates generally to a handle, and more particularly to a handle which can be precisely adjusted in its locating angle.

BACKGROUND OF THE INVENTION

Figure 1:
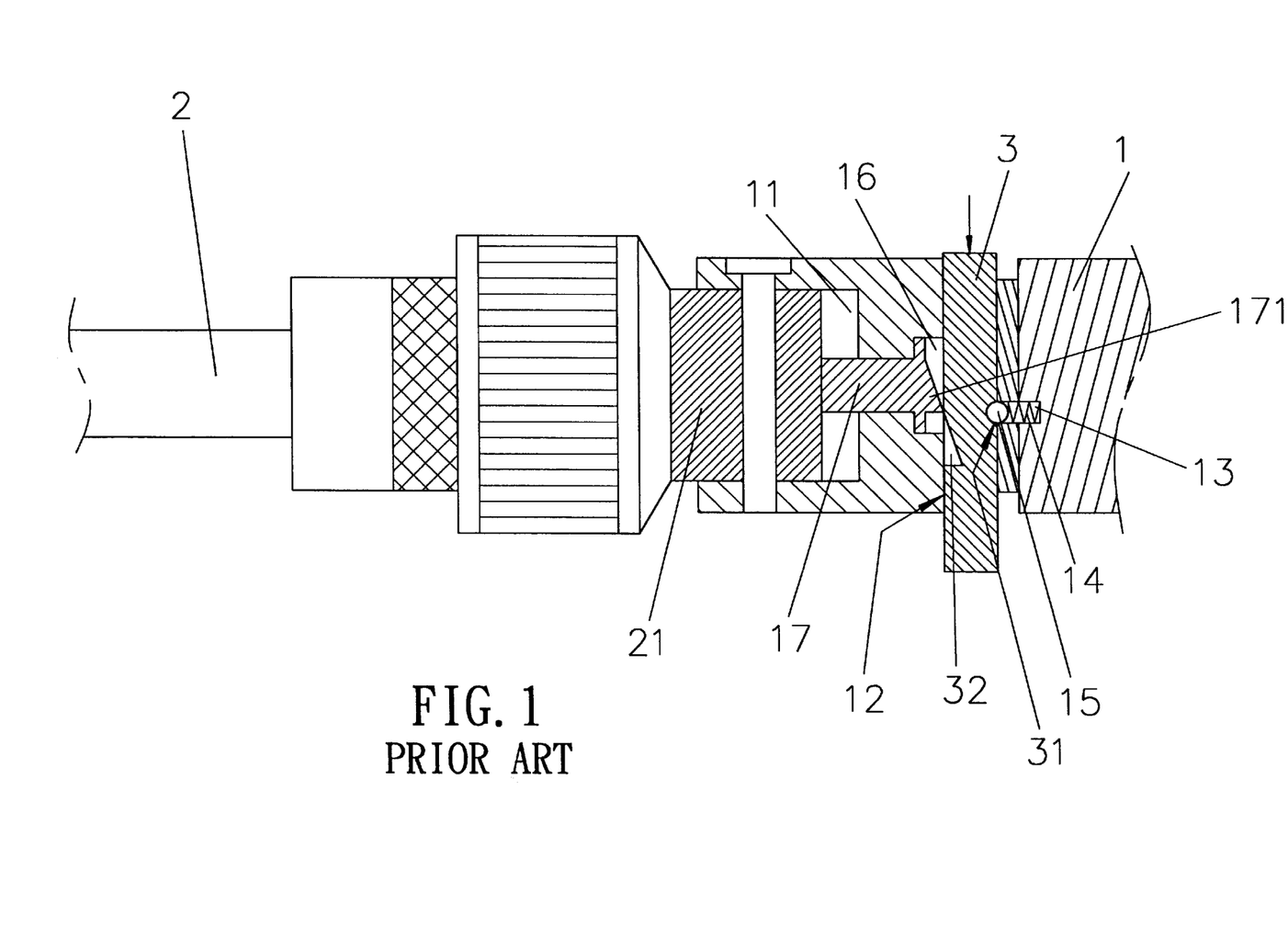
FIG. 1 shows a schematic view of the locating structure of a prior art handle in action.

The do-it-yourself (DIY) hand tools are becoming popular among the consumers at large. In order to enhance the competitiveness of the hand tools, the makers of the hand tools center their reseach and development on the improvement on performance of the handle of the hand tools. As shown in FIG. 1, a prior art handle 1 is provided at the front end thereof with a slot 11 which is pivoted with a protrusion 21 of the driver rod 2. Located in the proximity of the slot 11 is a through hole 12 which is provided in one side of the inner wall thereof with a hole 13 in which a spring 14 and a steel ball 15 are disposed. The through hole 12 is provided in other side of the inner wall thereof with a stepped hole 16 in communication with the slot 11 for disposing an urging block 17 which has an inclined plane 171. A control rod 3 is disposed in the through hole 12 such that the control rod 3 is engaged with a steel ball 15 received in an arcuate slot 31, and that the inclined plane 171 of the urging block 17 is engaged with another arcuate slot 32. When one end of the control rod 3 is pressed to displace downward, the straight rod section urges the inclined plane 171 of the urging block 17 to confine the driver rod 2. When other end of the control rod 3 is pushed upward, the inclined plane 171 of the urging block 17 is received in the arcuate slot 32, so as to cause the urging block 17 to withdraw. As a result, the application angle of the handle 1 can be adjusted. Such a prior art design as described above results in inconvenience in assembly and use of the handle 1. For example, before the control rod is disposed in the through hole of the handle to confine the steel ball and the urging block, the steel ball is urged by the spring to move out. In the meantime, if the head end of the handle is pushed upward, the urging block falls on the floor. On the contrary, if the steel ball falls on the floor, the assembly of the elements of the locating structure is relatively difficult. If the control rod sways in the midst of the use of the handle, the steel ball is retracted along the arcuate slot, thereby resulting in the release of the control rod as well as the withdrawal of the urging block. As a result, the handle can not be located. In addition, there is no temporary support between the handle and the driver rod, the user must use one hand to support the driver rod while adjusting the application angle of the handle.

SUMMARY OF THE INVENTION

The primary objective of the present invention is to provide a handle capable of being adjusted and located in the application angle thereof.

In keeping with the principle of the present invention, the foregoing objective of the present invention is attained by a handle, which is provided at the front end thereof with a receiving slot which is in turn provided therein with an inner hole for receiving an urging block. The urging block is provided in the interior thereof with a horizontal long slot having a front inclined plane such that the top of front end thereof is extended into the receiving slot. The handle is further provided with a through hole in communication with the inner hole for receiving a press rod and a spring. The press rod has a straight section, which is put through the horizontal long slot of the urging block and is jutted out of the through hole. The spring is sealed off in the through hole by a bolt. A hand tool head is provided at the rear end thereof with a protrusion which is pivoted to the receiving slot. In the normal state, the press rod is urged by the spring such that the front inclined plane urges the urging block so as to enable the urging block to locate the hand tool head. In adjusting the angle, the press rod is pressed to put a pressure on the spring so as to cause the front inclined plane to displace inward to remain a distance away from the front inclined plane of the urging block, thereby resulting in the inward displacement of the top of the urging block. As a result, the hand tool head is relieved of the retaining effect.

It is another objective of the present invention to provide a spring which is disposed between the urging block and the inner hole. When the urging block is urged by the protrusion of the hand tool head to displace inward, the spring is pressed downward such that a retaining portion of the hand tool head is elastically engaged with the spring, and that the hand tool head is prevented from a free fall at the time when the hand tool head is relieved of the retaining effect.

It is another objective of the present invention to provide the urging block with a pointed top, and the protrusion of the hand tool head with a plurality of toothed slots. When the urging block is urged by the press rod to extend, the top of the urging block is inserted into the toothed slot of the retaining portion of the protrusion of the hand tool head.

DETAILED DESCRIPTION OF THE INVENTION

As shown in FIGS. 2–8, the present invention comprises a handle 10, a press rod 20, and a hand tool head 30.

Figure 2:
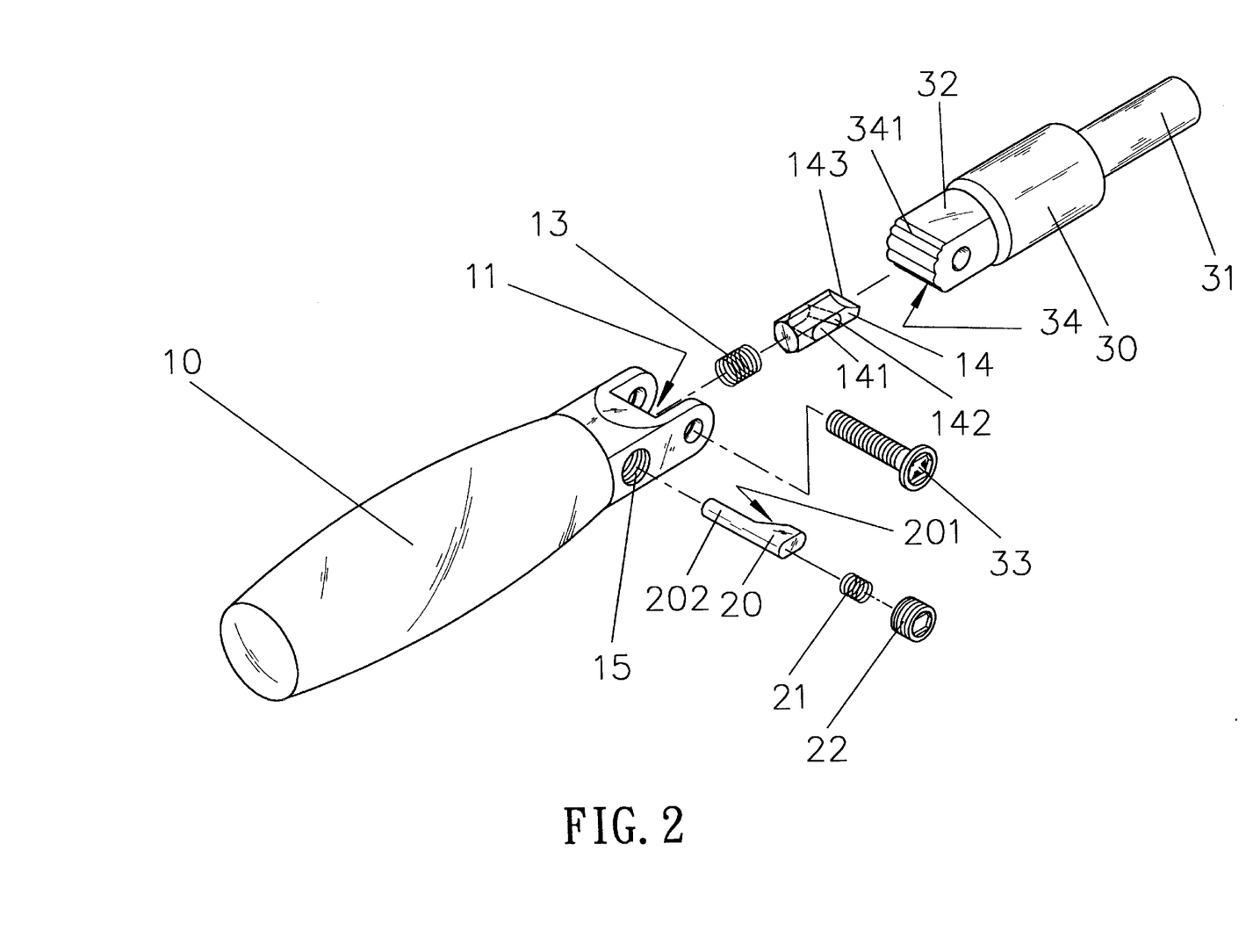
FIG. 2 shows an exploded view of the present invention.
Figure 3:
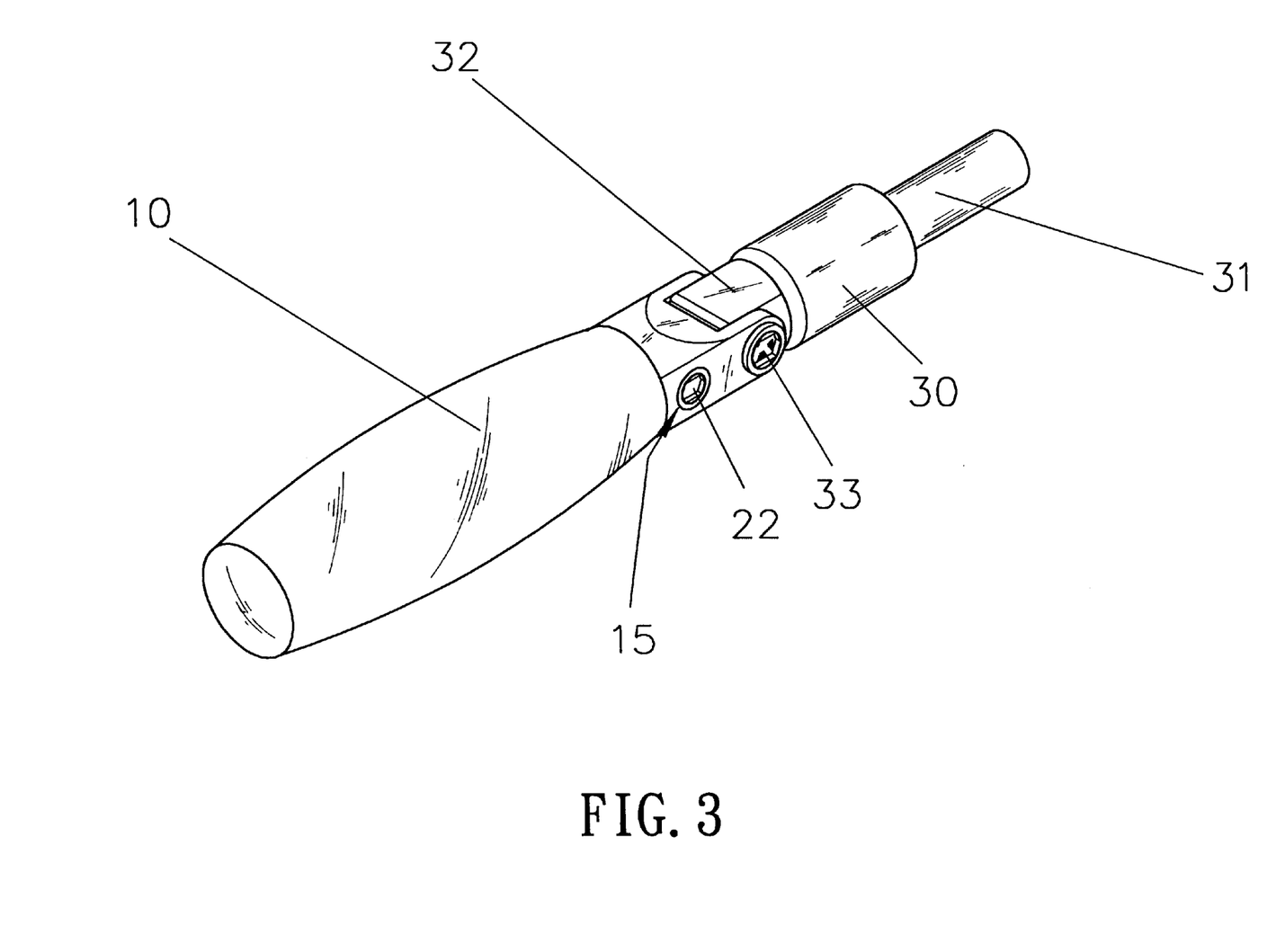
FIG. 3 shows a perspective view of the present invention in combination.

The handle 10 is provided at the front end thereof with a receiving slot 11 which is provided with an inner hole 12 for receiving a spring 13 and an urging block 14. The urging block 14 is provided in the interior thereof with a horizontal long slot 141 having a front inclined plane 142, and is provided at the front end thereof with a pointed top 143 which is jutted out of the receiving slot 11. Located in the proximity of the receiving slot 11 is a through hole 15 passing through the inner hole 12.

The press rod is disposed in the through hole 15 of the handle 10 and is provided with a front inclined plane 201 and a straight section 202 smaller in diameter and passing through the horizontal long slot 141 of the urging block 14 such that its end is jutted out of the through hole 15, and that the front inclined planes 201 and 142 are joined together, and further that the press rod 20 is secured in place in the through hole 15. The large diametrical end is provided with a spring 21 which is located in the through hole 15 by a bolt 22.

The hand tool head 30 is provided at the front end thereof with a tool portion 31, such as a driver rod, ratchet wheel, wrench head, etc., and at the rear end thereof with a protrusion 32 which is received in the receiving slot 11 of the handle 10 such that the protrusion 32 is pivoted by a pivoting member 33 so as to fasten the hand tool head 30 with the front end of the handle 10. The protrusion 32 is provided with a retaining portion 34 capable of cooperating with the top 143 of the urging block 14.

Figure 4:
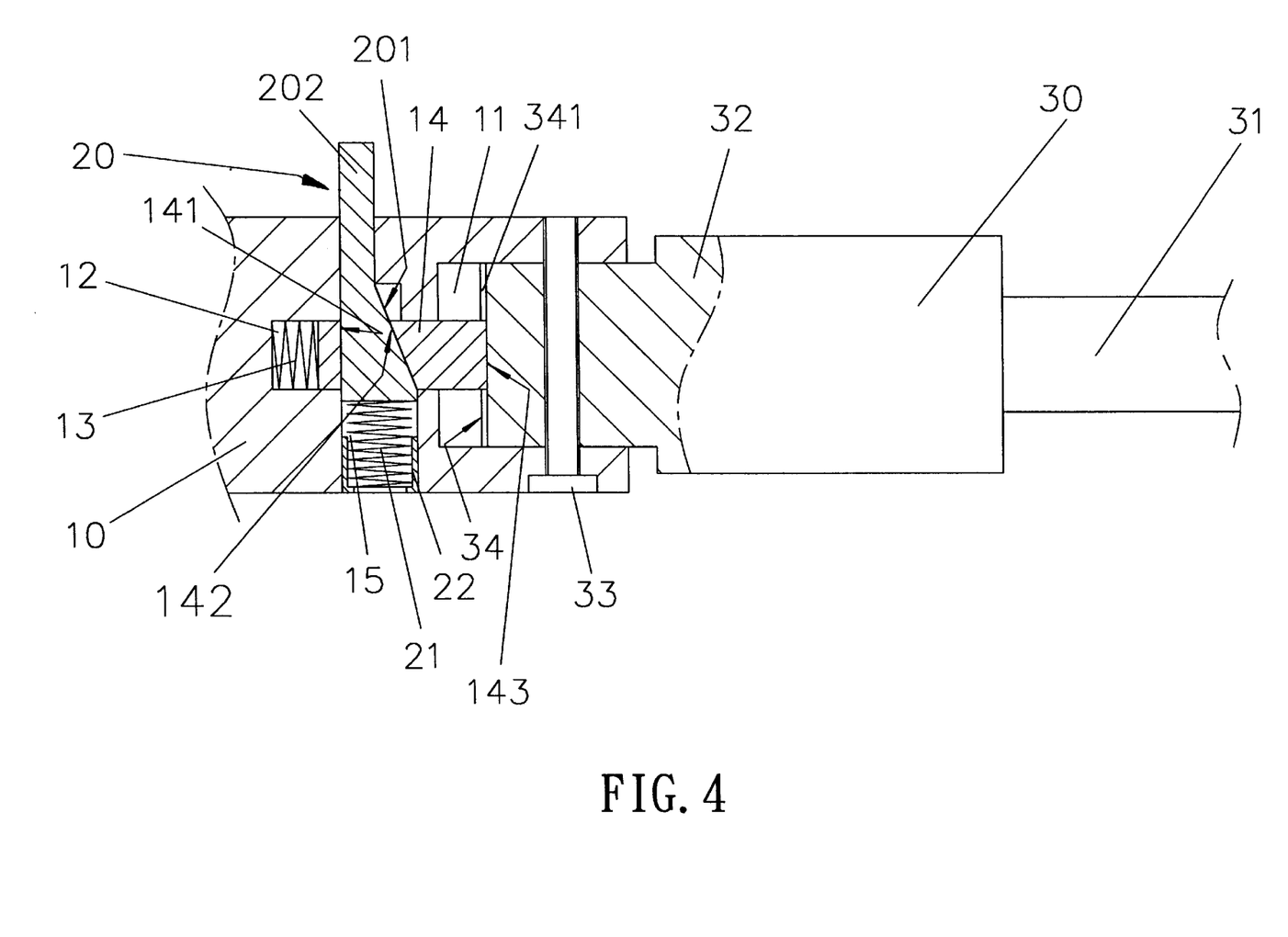
FIG. 4 shows a longitudinal sectional view of the present invention.
Figure 5:
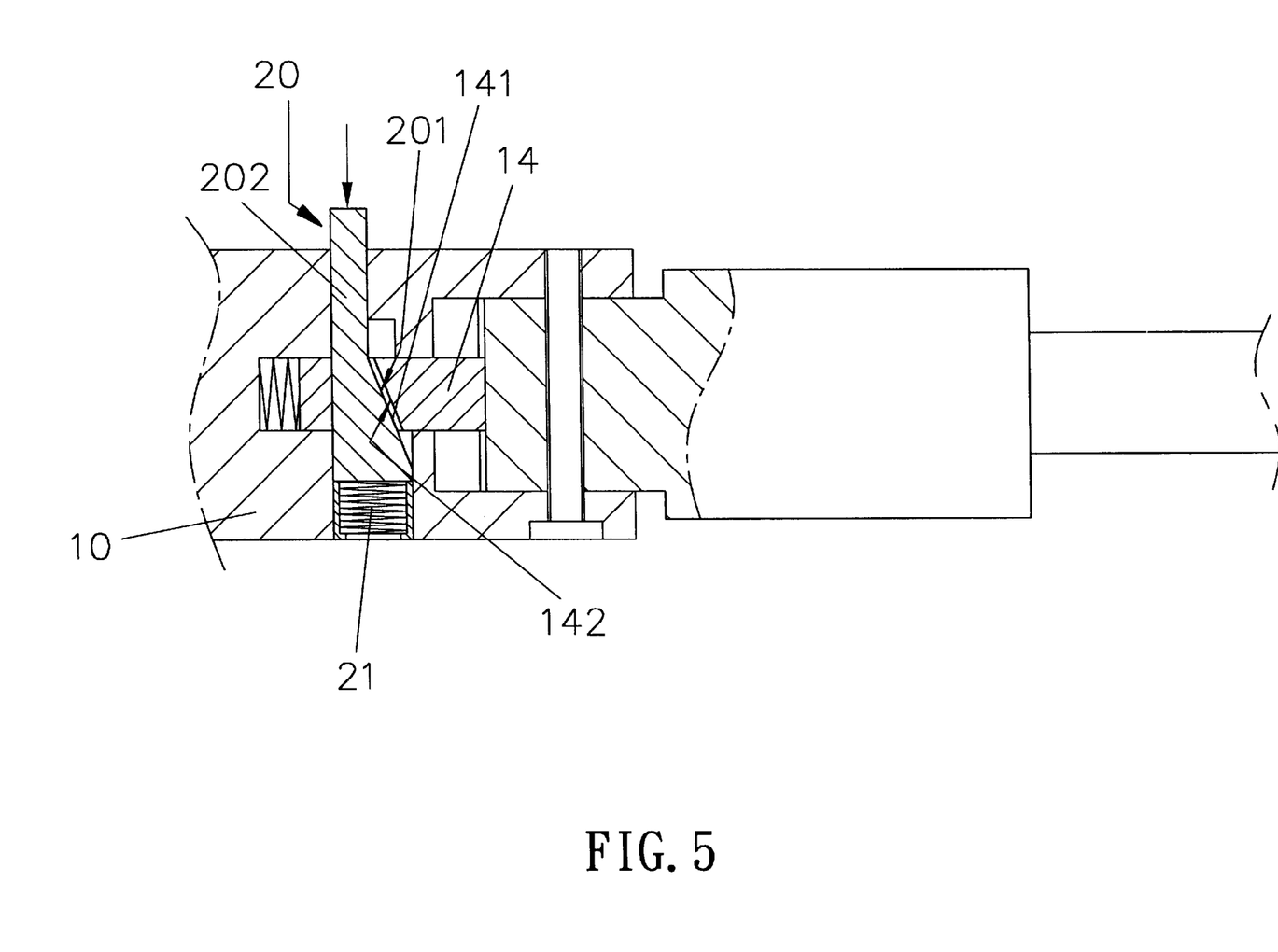
FIGS. 5–7 are schematic views of the adjustment motions of the present invention.
Figure 6:
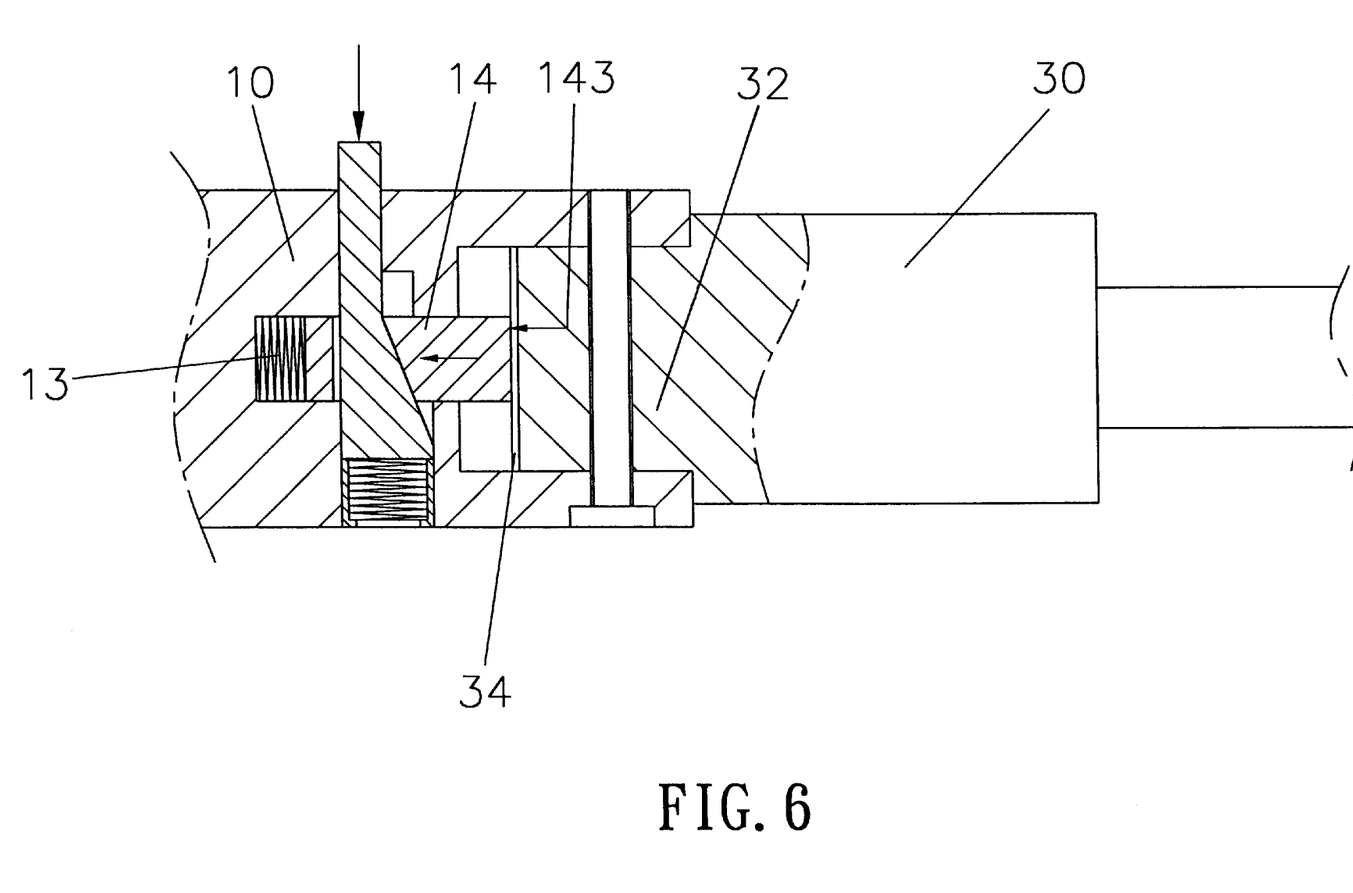
Figure 7:
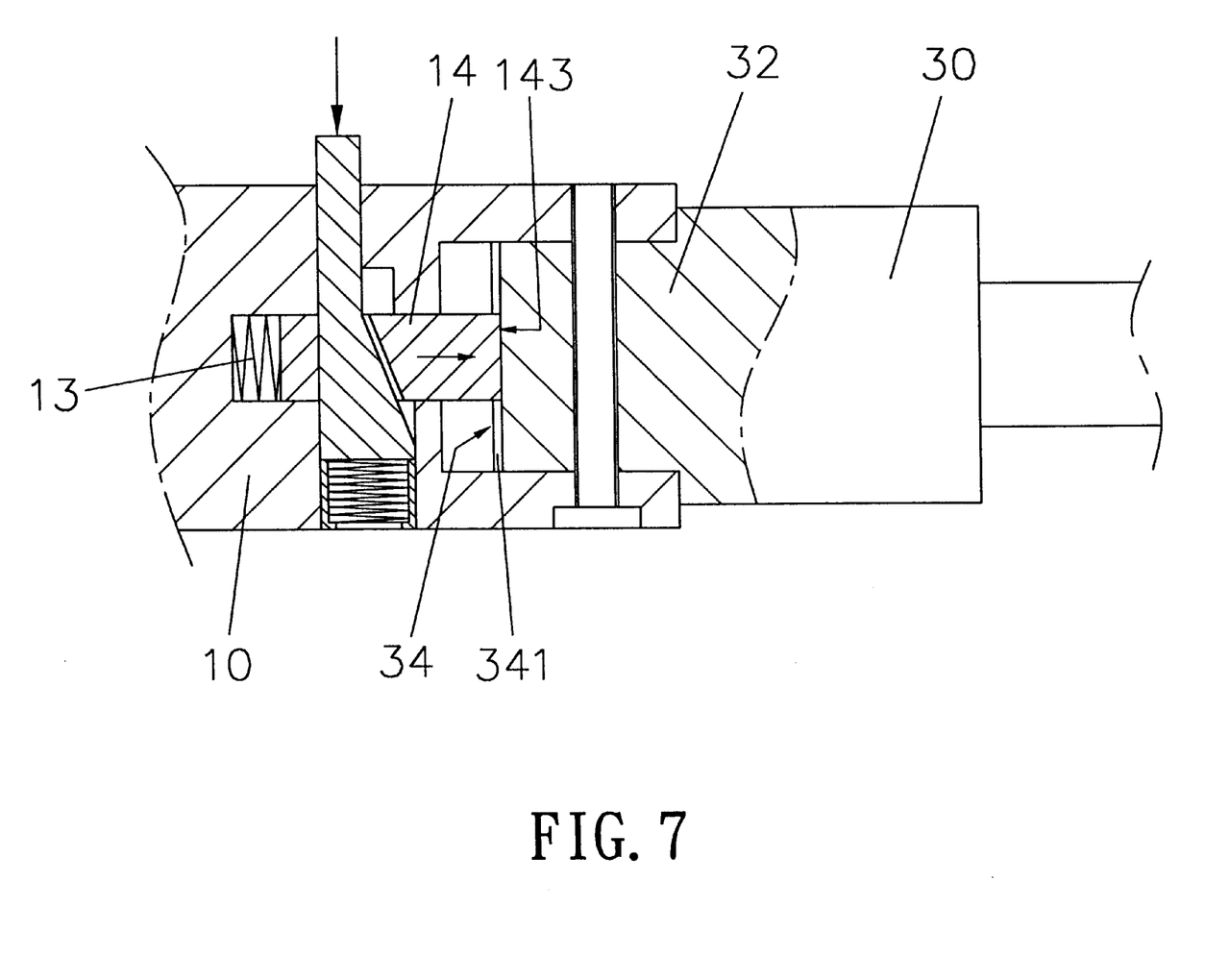
Figure 8:
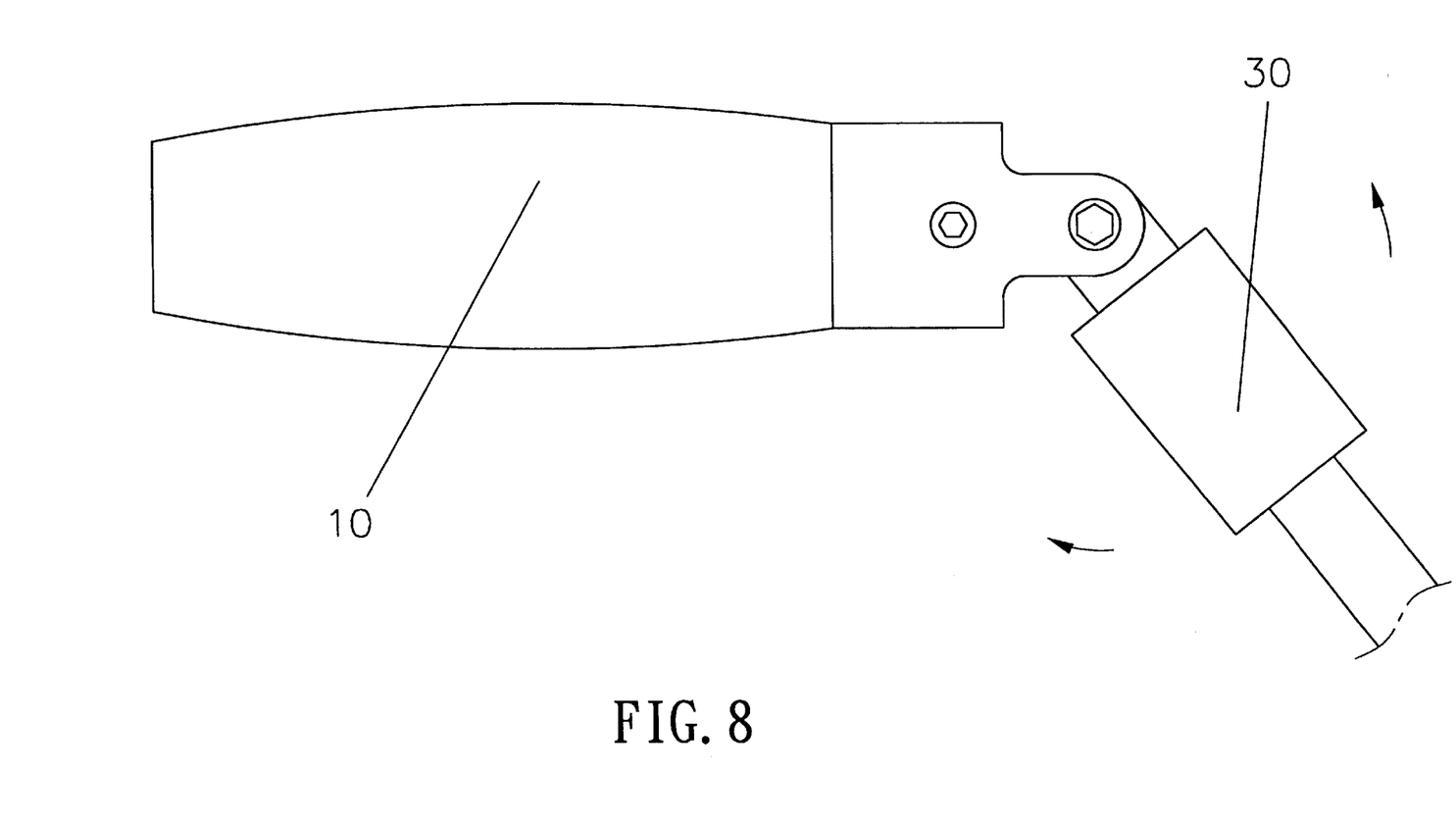
FIG. 8 shows a schematic view of the present invention at work.

As shown in FIG. 4, when the handle 10 is in the normal state, the press rod 20 is urged by the spring 21 such that the end of the straight section 202 is jutted out of the through hole 15, and that the inclined plane 201 urges the inclined plane 142, and further that the urging block 14 is urged outward, and further that the top 143 is inserted into a toothed slot 341 of the retaining portion 34 of the protrusion 32. As a result, the handle 10 and the hand tool head 30 are joined together by means of the top 143 of the urging block 14 and the retaining portion 34 of the protrusion 32. As shown in FIG. 5, the press rod 20 is pressed to adjust the application angle of the handle 10 such that the spring 21 is compressed by the press rod 20 to cause the front inclined plane 201 to withdraw so as to remain a distance away from the front inclined plane 142 of the urging block 14, thereby enabling the urging block 14 to displace inward. As shown in FIG. 6, the handle 10 is turned such that the top 143 of the urging block 14 is urged to displace inward by the retaining portion 34 of the protrusion 32 of the hand tool head 30, and that the spring 13 is compressed. As a result, the retaining portion 34 of the protrusion 32 of the hand tool head 30 is relieved of the retaining effect of the top 143 of the urging block 14 of the handle 10. The application angle of the handle 10 can be thus adjusted as desired. Now referring to FIGS. 7 and 8, when the urging block 14 of the handle 10 is urged by the retaining portion 34 of the protrusion 32 of the hand tool head 30, the urging block 14 compresses the spring 13 to move away from the retaining portion 34 of the hand tool head 30. In the meantime, the urging block 14 is elastically engaged with the retaining portion 34 by the elastic force of the spring 13. When the top portion 143 is about to engage the next toothed slot 341, the top portion 143 is urged outward by the elastic force of the spring 13 so as to engage the toothed slot 341. The hand tool head 30 is thus prevented from a free fall at such time when the hand tool head 30 is relieved of the retaining effect of the urging block 14. The locating angle of the handle 10 is thus adjusted with ease and precision.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A handle adjustable in a locating angle thereof, said handle comprising:

a handle provided at a front end thereof with a receiving slot, said receiving slot being provided therein with an inner hole for receiving an urging block which is provided with a horizontal long slot having a front inclined plane, said urging block having a top which is received in said receiving slot, said handle further provided with a through hole contiguous to said receiving slot and passing through said inner hole;

a press rod received in said through hole and provided with a front inclined plane, a small diametrical straight section, and a large diametrical end, said small diametrical section passing through said horizontal slot such that said front inclined plane of said press rod joins with said front inclined plane of said horizontal long slot, said large diametrical end being provided therebehind with a spring which is received in said through hole and located by a locating member; and a hand tool head provided at a front end thereof with a tool portion, and at a rear end thereof with a protrusion whereby said protrusion is pivoted with said receiving slot of said handle and is provided with a retaining portion cooperative with said top of said urging block.

2. The handle as defined in claim 1, wherein said urging block and said inner hole are provided therebetween with a spring.

3. The handle as defined in claim 1, wherein said top of said urging block is pointed.

4. The handle as defined in claim 1, wherein said retaining portion of said hand tool head is provided with a toothed slot.

5. The handle as defined in claim 1, wherein said locating member is a bolt engaging said through hole.

* * * * *